March 25, 1930.　　　　A. A. CRIPPS　　　　1,751,907
ADJUSTABLE SEAT
Filed March 19, 1928　　　2 Sheets-Sheet 1

Albert A. Cripps, Inventor

By Whittemore, Hulbert, Whittemore & Belknap
Attorneys

March 25, 1930.　　　A. A. CRIPPS　　　1,751,907
ADJUSTABLE SEAT
Filed March 19, 1928　　2 Sheets-Sheet 2
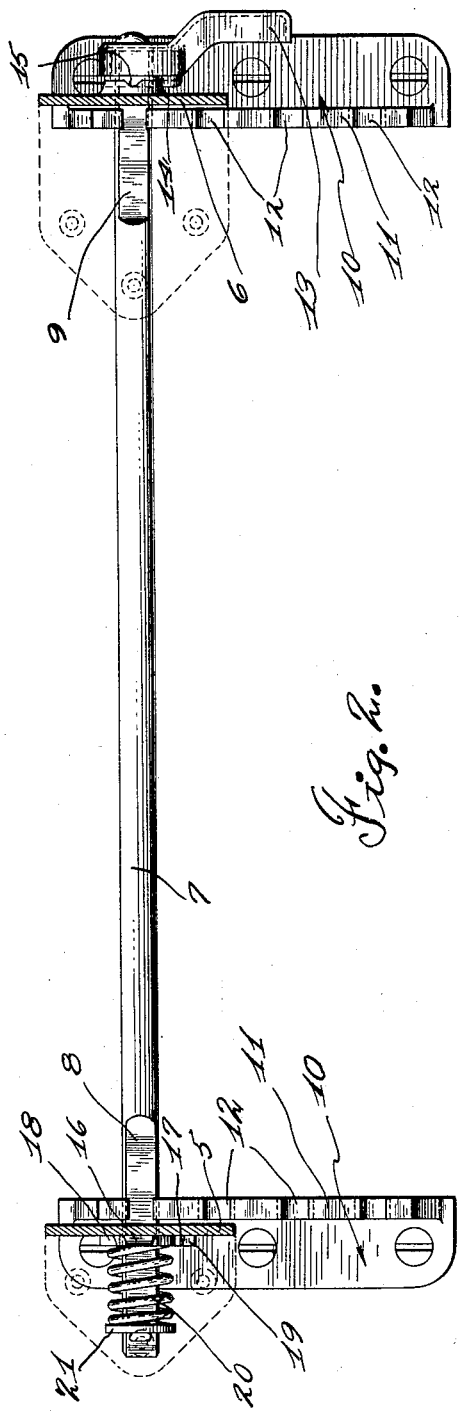
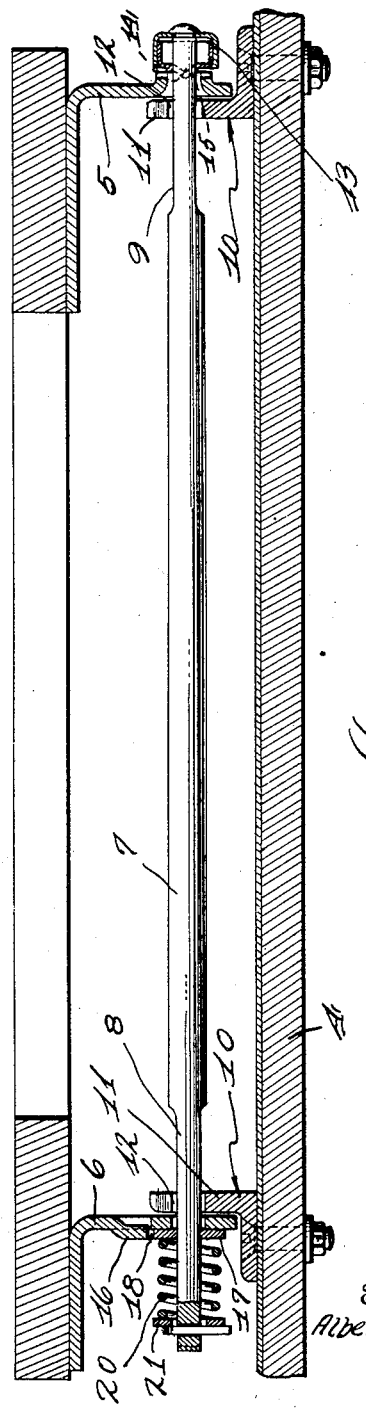
Inventor
Albert A. Cripp.

Patented Mar. 25, 1930

1,751,907

UNITED STATES PATENT OFFICE

ALBERT A. CRIPPS, OF DETROIT, MICHIGAN, ASSIGNOR, BY MESNE ASSIGNMENTS, TO CHRYSLER CORPORATION, A CORPORATION OF DELAWARE

ADJUSTABLE SEAT

Application filed March 19, 1928. Serial No. 262,917.

This invention relates to seat constructions and particularly to the front seat construction of motor vehicles.

The invention finds particular utility, although it is not necessarily so limited when used in connection with motor vehicles of the closed body type.

In the front seat constructions of vehicles of this type, it has been the practice to either provide a unitary front seat extending from side to side and rigidly secured to the vehicle body, or to provide a pair of single seats, each seat being spaced laterally from the other and so formed as to constitute an individual unit separate and distinct from the other. It is readily apparent that the former type of seat is the more comfortable and will comfortably seat three persons whereas with the latter construction, if three persons attempt to sit in front, the arrangement is not very satisfactory and at best provides an uncomfortable seat for the person in the center. With the permanent seat construction, it is of course impossible to adjust the same relative to the foot board of the vehicle so as to accommodate persons of different height.

In the present construction the objectionable features of both types of seats have been eliminated, while the good features have been retained and incorporated therein. This is accomplished by providing a front seat construction having the same general outlines and comfortable contours of the permanent seat but making the seat in two sections and providing means for both pivotally mounting each section independently of the other and for adjusting each section forwardly and rearwardly, thereby permitting tilting of each seat and allowing each seat to be adjusted relative to the foot board in accordance with the requirements of the occupant.

With the above and other objects in view the invention consists in certain novel features of construction, combinations and arrangements of parts as will be more fully described and particularly pointed out in the appended claims.

In the accompanying drawings:

Figure 2 is a plan view with the seat removed and the brackets in section.

Figure 3 is a vertical section through the supporting and adjusting means.

Figures 1, 4:
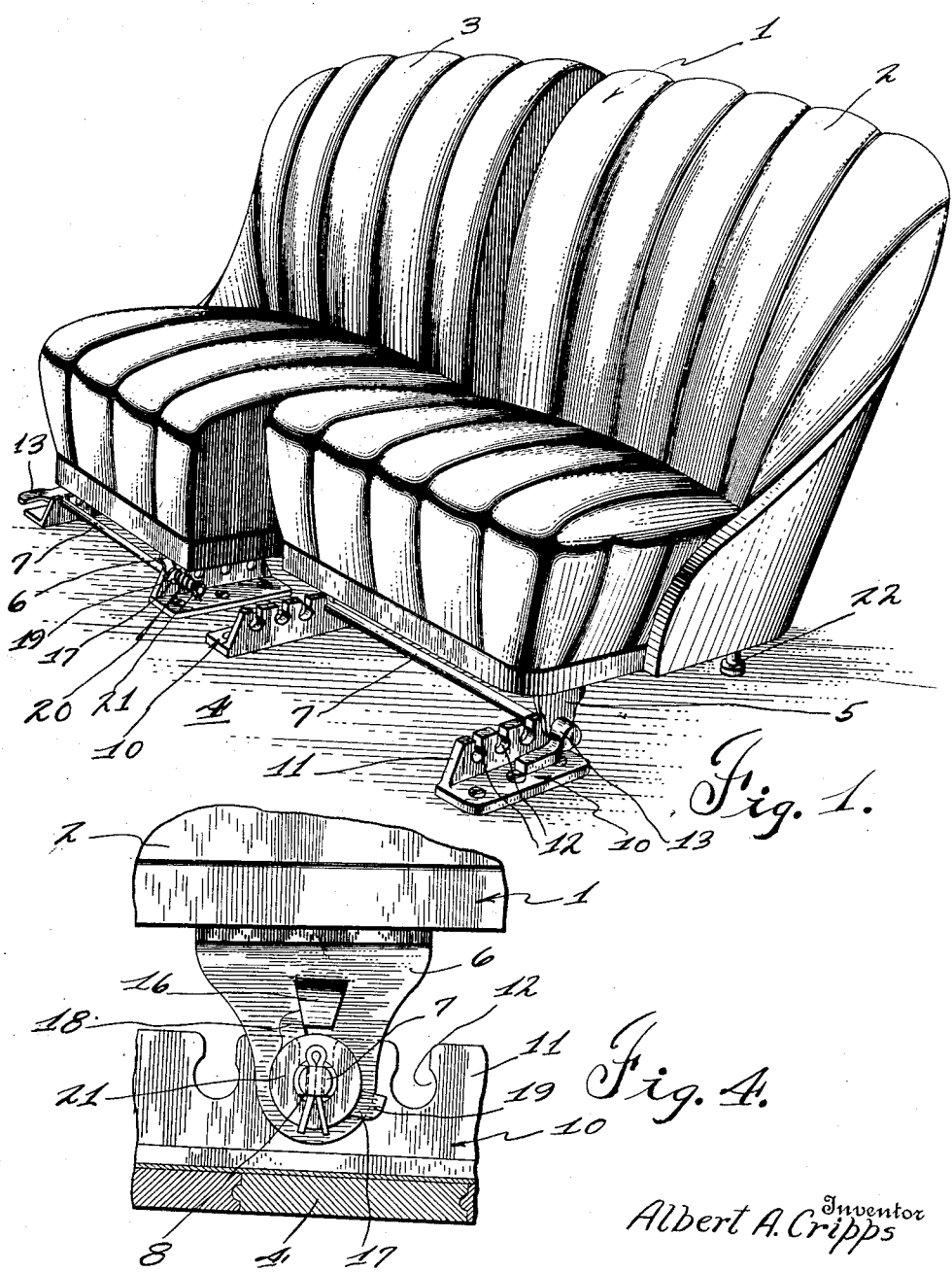
Figure 1 is a perspective view of a seat made in accordance with the present invention.
Figure 4 is a fragmentary end view of the adjusting and supporting means.

Referring particularly to Figure 1 of the drawings there is illustrated a front seat construction 1 which is adapted to extend entirely across the vehicle body (not shown) and which consists of two seat sections 2 and 3 respectively, each section forming a complete single seat but being so arranged that when taken together with the other section, there is provided a unitary seat which has all the characteristics of a permanent full sized front seat. These sections are supported upon the flooring 4 of the vehicle and are adapted for independent pivotal movement and for forward and rearward adjustment relative to the flooring. In view of the fact that the means for mounting each seat section is identical, only one such construction will be described herein.

Each section is provided with depending brackets 5 and 6 respectively, adjacent the front end thereof, which are provided with aligned apertures in which is rotatably and slidably mounted a tie rod 7, this rod being provided adjacent its ends with flattened portions 8 and 9, the purpose of which will be presently described.

Secured to the flooring 4 of the vehicle, is a pair of supporting racks 10, each being provided with an upstanding portion 11 provided with a plurality of spaced recesses 12. The inner portions of each recess is preferably of circular formation while the outer portion is of restricted formation and is adapted to receive one of the flattened portions of the tie rod when this rod is held in a certain predetermined position. For rotating the tie rod in the brackets, a handle 13 is secured to one end of the rod on the outer side of the bracket 5, and is provided with an inwardly extending cam surface 14 adapted for engagement in the spaced web-shaped depressions 15 formed in the bracket and surrounding the opening through which the rod extends.

The bracket 6 at the other side of the seat section is provided with a struck out portion 16 constituting a stop member while a stop washer 17 is splined upon the tie rod on the outer side of the bracket 6 and is provided with a pair of spaced lugs 18 and 19 respectively, which are adapted to alternately contact with the stop member for limiting the rotation of the rod in each direction. Preferably a coil spring 20 is mounted on the shaft and is adapted to be secured between the stop washer 17 and a second washer 21.

With the construction as thus described and assuming that the seat section 2 is in the position shown in Figure 1, if it is desirable to adjust the section to a position closer to the foot board, it will only be necessary to turn the handle 13 from a horizontal to a vertical position. This will rotate the rod, turning the flattened portions thereof from a horizontal to a vertical position so that the same may pass through the resctricted portions of the recesses 12 and thereby permit the tie rod to be removed from the racks and allow the seat to be detached from the flooring for adjustment. With the tie rod in this latter position, it will only be necessary to slip the flattened portions of the rod past the restricted portions of a second set of recesses and then turn the handle to a horizontal position whereby the rod will be rotated so that the flattened portions will be moved in the enlarged portions of the recesses to a horizontal position and thus effectually prevent removal of the rod and seat from the racks. It will be apparent that the tension exerted on the tie rod by the spring 20 will yieldably retain the cam portion 14 of the handle in either of the depressions 15, these depressions being so positioned as to receive the cam portion in the horizontal and vertical positions of the handle. The lugs 18 and 19 of the stop washer 17 are so arranged as to cooperate with the portions 14 and 15 and limit the movement of the tie rod between the vertical and horizontal positions previously mentioned.

For facilitating the adjustment of each seat section and as clearly shown in Figure 1 of the drawings, the handle portion is located at the outer side of each seat section and the stop washer and spring members are positioned at the inner side of the sections. Preferably each section is provided adjacent the rear end thereof with a supporting member 22 which is preferably screw threaded for vertically adjusting the rear end of the section.

From the foregoing it will be apparent that I have provided a novel form of front seat construction comprising complementary seat sections which when taken together form a complete front seat extending from side to side of the vehicle, said sections however constituting in themselves, complete seat units which are both pivotally and adjustably mounted upon the flooring of the vehicle, thereby permitting movement of the sections relative to each other and to the floor board of the vehicle.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What I claim as my invention is:

1. In combination, a motor vehicle having a flooring, a seat, and means for pivotally and adjustably mounting said seat upon said flooring including a pair of spaced racks secured to the flooring, each rack being provided with spaced recesses, a tie rod carried by said seat and receivable in said recesses, and means for locking said tie rod to said racks.

2. In combination, a motor vehicle having a flooring, a pair of spaced racks secured to said flooring, each rack being provided with a plurality of spaced recesses, a seat, a tie rod carried by and extending crosswise of said seat, said rod being engageable with the recesses of said racks for pivotally and adjustably supporting said seat upon the flooring.

3. In combination, a motor vehicle having a flooring, a pair of spaced racks secured to said flooring, each rack being provided with a plurality of spaced recesses, a seat, a pair of brackets depending from said seat, a tie rod mounted in said brackets and having portions engageable in the aforesaid recesses for pivotally and adjustably supporting said seat upon the flooring.

4. In combination, a motor vehicle having a flooring, a pair of spaced racks secured to said flooring, each rack being provided with a plurality of spaced recesses, a seat, a pair of brackets depending from said seat, a tie rod mounted in said brackets and having portions engageable in the aforesaid recesses, and means for rotating said tie rod in said recesses for locking said seat to said racks.

5. In combination, a motor vehicle having a flooring, a pair of spaced racks secured to said flooring, each rack being provided with a plurality of spaced recesses having restricted openings, a seat, a pair of brackets depending from said seat, a tie rod mounted in said brackets and provided with spaced flattened portions adapted for engagement in said recesses, and a handle secured to one end of said tie rod for rotating the same in said recesses, whereby the seat will be detachably locked to said racks.

6. In combination, a motor vehicle having a flooring, a pair of spaced racks secured to said flooring, each rack being provided with a plurality of spaced recesses having restricted openings, a seat, a pair of brackets depending from said seat, a tie rod mounted in said brackets and provided with spaced flattened portions adapted for engagement in said recesses, a handle secured to one end of said tie rod for rotating the same, said handle being provided with a cam surface for alternately engaging depressed portions in one of said brackets to retain said tie rod in different postions of adjustment.

7. In combination, a motor vehicle having a flooring, a pair of spaced racks secured to said flooring, each rack being provided with a plurality of recesses having restricted entrance openings, a seat, a tie rod rotatably carried by said seat and provided with flattened portions adapted for engagement in said recesses, and means for rotating said rod to postions locking the seat to the racks or permitting disengagement therefrom.

8. In combination, a motor vehicle having a flooring, a pair of spaced racks secured to said flooring, each rack being provided with a plurality of recesses having restricted entranace openings, a seat, a tie rod rotatably carried by said seat and provided with flattended portions adapted for engagement in said recesses, means for rotating said rod to positions locking the seat to the racks or permitting disengagement therefrom, and means for retaining said rod in its different positions of adjustment.

In testimony whereof I affix my signature.

ALBERT A. CRIPPS.